United States Patent [19]

Varley

[11] 4,118,705
[45] Oct. 3, 1978

[54] ADAPTIVE INTERFACE FOR ROTATIONAL POSITIONING DEVICE UTILIZING LINEAR ACTUATORS

[75] Inventor: Robert Fred Varley, Indialantic, Fla.

[73] Assignee: Harris Corporation, Cleveland, Ohio

[21] Appl. No.: 825,936

[22] Filed: Aug. 19, 1977

[51] Int. Cl.$^2$ .................. G01S 3/44; G05B 19/40; H01Q 3/00

[52] U.S. Cl. .................. 343/100 AD; 318/616; 318/618; 318/685; 318/687; 343/117 R; 343/766

[58] Field of Search ............ 343/100 AD, 117 R, 766; 318/615, 616, 618, 685, 687

[56] References Cited

U.S. PATENT DOCUMENTS

| | | | |
|---|---|---|---|
| 2,647,258 | 7/1953 | McCoy | 318/616 X |
| 3,842,420 | 10/1974 | Rabow | 343/117 R |
| 3,935,523 | 1/1976 | Cleveland et al. | 318/616 X |

Primary Examiner—T.H. Tubbesing
Assistant Examiner—Richard E. Berger

[57] ABSTRACT

An adaptive interface circuit for use in coupling movement commands to a device utilizing linear actuators to control the rotational position of a rotatable member. Since the rotational position of the rotational member is not a linear function of the extension of the linear member, the rotational controller may be characterized as having a gear ratio which varies with the position of the rotatable member. The system includes an adaptive interface which modifies the gain of the movement commands in a manner designed to offset gear ratio changes so that the system as a whole will respond linearly to the movement commands. The system is described with particular reference to an antenna tracking system.

4 Claims, 5 Drawing Figures

CURVE GENERATOR 32

ADAPTIVE INTERFACE FOR ROTATIONAL POSITIONING DEVICE UTILIZING LINEAR ACTUATORS

BACKGROUND AND FIELD OF THE INVENTION

The present invention relates to the art of rotational positioning devices, and more particularly to a system for compensating for nonlinear response characteristics of rotational positioning devices employing linear actuators.

A linear actuator, in the sense that this term is used herein, is a device for controlling the linear distance between two end points. Included within this definition are all extensible arm actuators, such as hydraulic ram actuators, ball and screw type actuators, etc.

These actuators can be used in a known manner to provide rotational positioning of a rotatable element. Unfortunately, the increment of rotational movement produced by an incremental extension of the linear actuator is not constant over the entire extensible range of the linear actuator. This is not hindrance to use of linear actuators for providing rotational positioning in non-critical applications. In certain applications, however, this characteristic is quite unacceptable.

Linear actuators may, for example, be used in antenna pedestals for controlling the position of the antenna about an axis. Most antenna position control systems, however, are designed with the implicit assumption that the antenna will move in a uniform manner in response to uniform movement commands. This is particularly true of antenna tracking systems employing a step tracking algorithm (as described, for example, in the patent of Rabow, U.S. Pat. No. 3,842,420). Step tracking systems function to track signal sources by moving the antenna in discrete steps about an antenna axis; for their proper operation it is required that these steps be of uniform size. To this end, the step tracking commands supplied thereby are generally a series of fixed duration pulses. If these step tracking commands are directly applied to an antenna pedestal utilizing linear actuators, however, the resulting antenna movements will not have the required uniformity.

SUMMARY OF THE INVENTION

The present invention provides an adaptive interface circuit for use in coupling linear movement commands to a rotational positioning device employing linear actuators. This interface circuit modifies the commands so that the relationship between the movement commands and the resulting rotational movement is linear.

In accordance with one aspect of the present invention, apparatus is provided for rotationally positioning a rotatable member in response to rotation control signals supplied by a rotation control system. This apparatus comprises a rotational controller including at least one linear actuator which is mechanically coupled to a rotatable member for controlling the rotational position of the rotatable member by adjusting the linear extension of the actuator. The linear actuator is responsive to an actuator control signal for controlling the extension of the linear actuator so as to thereby control the rotational position of the rotatable member, but wherein the change in rotational position of the rotatable member produced by the actuator control signal is dependent upon the position of the rotatable member. A position sensor provides an indication of the position of the rotatable member. An interface circuit is then provided for interfacing the rotation control system with the rotational controller. This interface circuit modifies the rotation control signals in response to the position indication provided by the position sensor so that the change in rotational position produced by the rotation control signals is not a function of the position of the rotatable member.

In accordance with a more limited aspect of the invention, this interface circuit includes a circuit which is responsive to the position indication for providing a compensation signal which is functionally related thereto in a functional dependence closely matching the nonlinear relationship between the extension of the linear actuator and the rotatable member. A compensation circuit is provided which multiplies the rotation control signal by the compensation signal to provide a compensated output signal which is used as the actuator control signal for the rotational controller. In this manner the gain of the rotation control signal is adjusted in accordance with a signal dependent upon the position indication so that uniform rotation control signals will produce a uniform resulting change in rotational position, regardless of the position of the rotatable member.

BRIEF DESCRIPTION OF THE DRAWINGS

The foregoing and other objects and advantages of the present invention will become more readily apparent from the following description of a preferred embodiment, as taken in conjunction with the accompanying drawings, which are a part hereof and wherein.

DETAILED DESCRIPTION OF THE DRAWINGS

Figure 1:
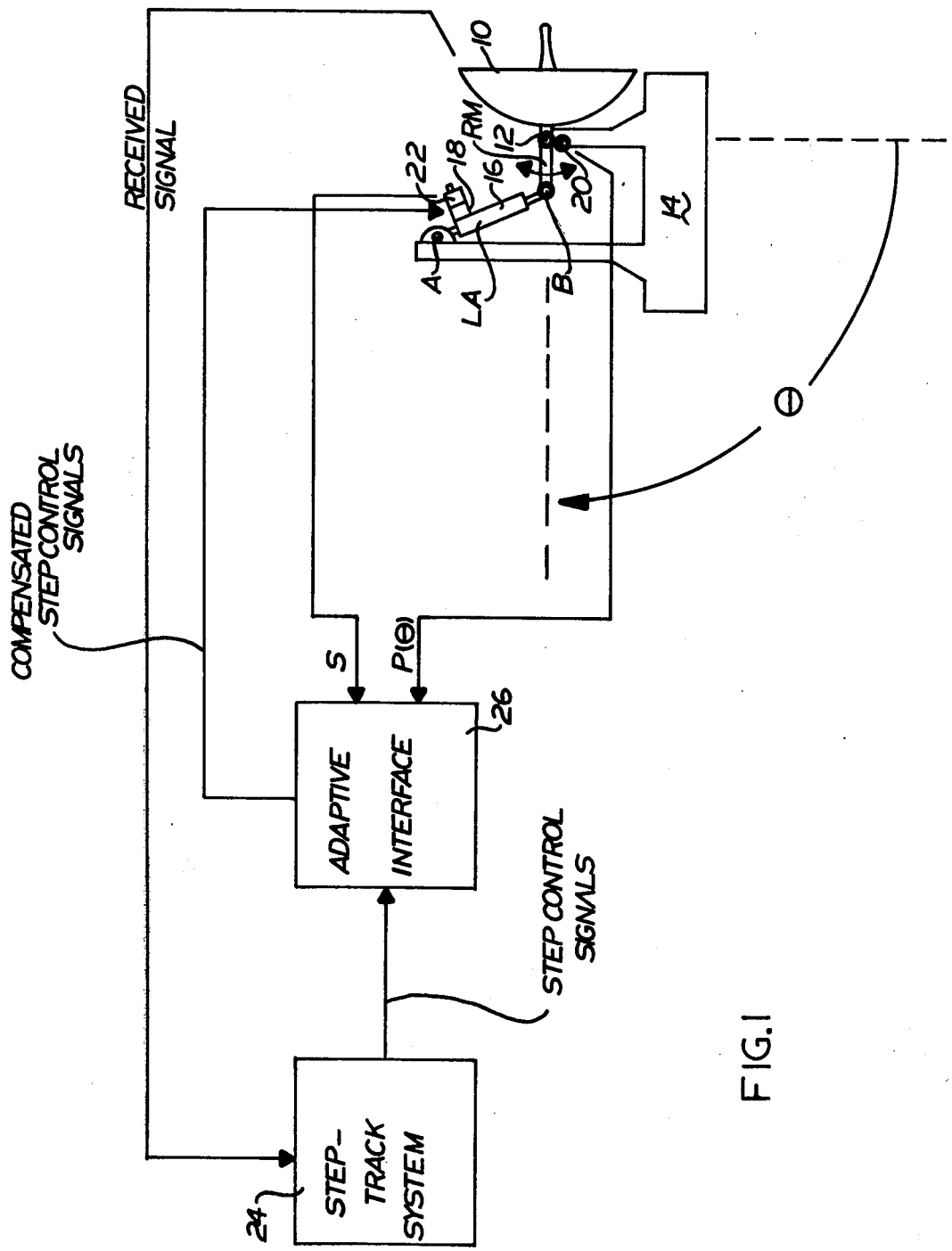
FIG. 1 is a general block diagram of the step tracking antenna system employing the present invention.

There is illustrated in FIG. 1 a step tracking system in which the present invention could conveniently find use. In this system, an antenna 10 is affixed to a rotatable member RM which is rotationally pivotable about an axis 12. This axis is rigidly fixed with respect to a base 14. The antenna 10 is rotated about axis 12 by means of a linear actuator (LA) 16. In the illustrated embodiment, linear actuator 16 is of the ball/screw type and includes a motor 18 for driving the linear actuator 16. For the purposes of the present discussion, it will be assumed that linear actuator 16 will change the distance between end points A and B by a fixed increment for each full revolution of motor 18. Motor 18 may conveniently be a DC motor so that the total rotation of motor 18 (and, consequently, the extension of linear actuator 18) will depend not only upon the amount of time for which motor 18 is energized, but also upon the DC level of the control signal supplied thereto. The change in extension of linear actuator 18 is therefore a linear function of the actuator control signal supplied to motor 18.

A position sensor 20 is associated with axis 12 and provides an analog signal P having a DC level which varies linearly with, and is therefore indicative of the rotational position of antenna 10 about axis 12. A tachometer 22 is operatively associated with motor 18 and provides a second analog signal S having a DC level which varies linearly with the speed of operation of motor 18.

In the illustrated embodiment, antenna 10 is rotated in increments by a step track system 24 which supplies step control commands in such a manner as to maximize the amplitude of the signal receivied by the antenna. These step control commands are comprised of pulses of constant amplitude and duration, with each pulse having a polarity which is dependent upon the direction in which antenna 10 is to be moved. Antenna 10 must be moved by fixed increments for each pulse provided by the step track system, regardless of the rotational position of antenna 10 about axis 12.

As stated previously, the relationship between the extension of linear actuator 16 and the angular position of antenna 10 will not be linear, that is, for different angular positions of antenna 10, uniform increments of extension of linear actuator 16 will not produce uniform angular increments of movement of antenna 10.

Figure 2:
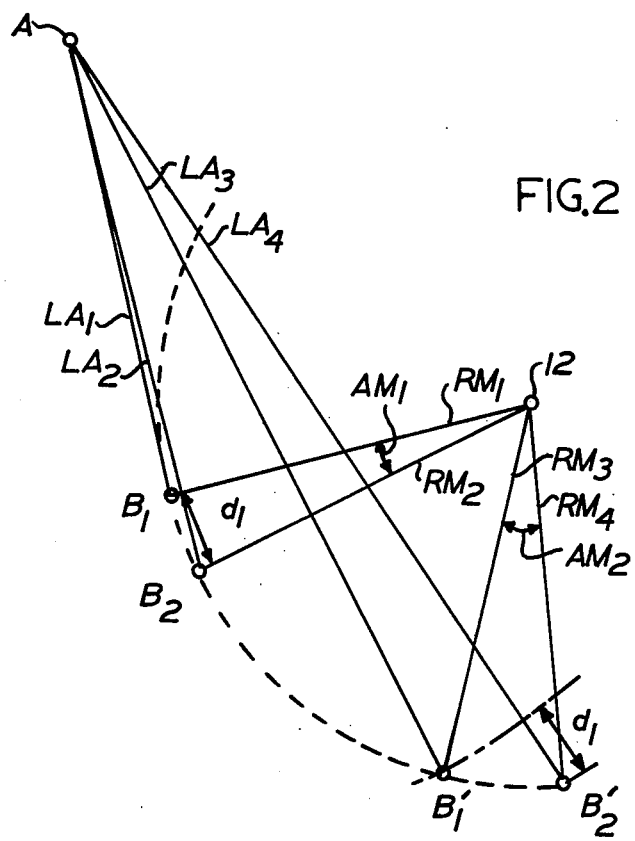
FIG. 2 is a diagram illustrating the non-uniformity of the gear ratio of the antenna pedestal of FIG. 1.

This may be understood more clearly with reference to the diagramatic illustration of FIG. 2. In this FIGURE, four possible positions of rotatable member RM about axis 12 are respectively indicated by the radial lines $RM_1$-$RM_4$. The corresponding positions of linear actuator LA are respectively indicated by lines $LA_1$–$LA_4$. The dotted, arcuate line identifies the path that end point B will be constrained to follow about axis 12 by rotatable member RM.

Linear actuator LA will control the position of the rotatable member by extending or shortening the distance between end points A and B. The rotatable member may be moved between positions $RM_1$ and $RM_2$, for example, by operating motor 18 to cause linear actuator LA to extend by an incremental amount $d_1$. This will therefore cause an angular movement of AM1 by the rotatable member. If rotatable member RM had instead been located at position $RM_3$, however, it will be seen that the increment of angular movement (AM2) occasioned by an incremental extension $d_1$ of linear actuator LA would have been quite different.

Figure 3:
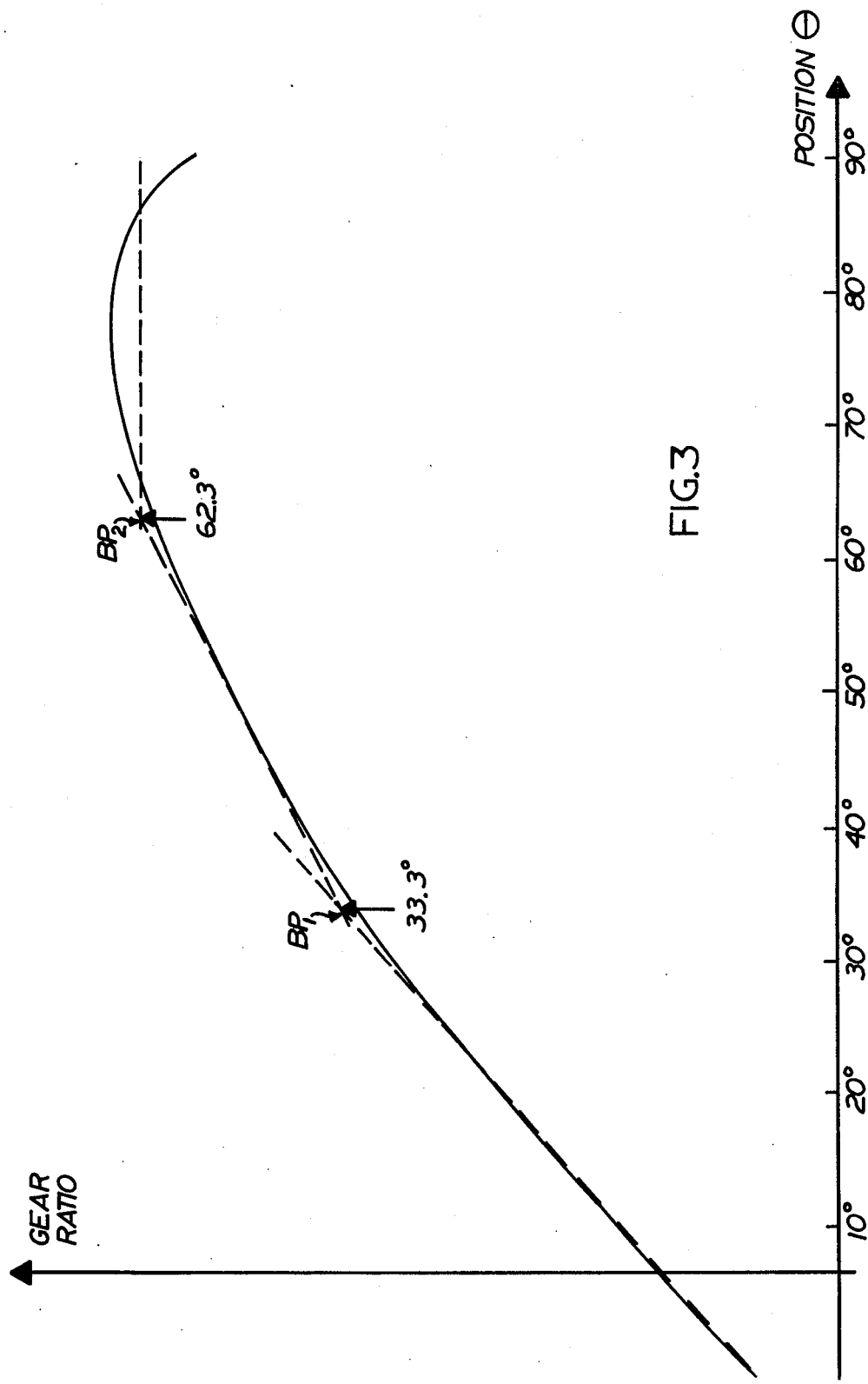
FIG. 3 is a graph of the pedestal gear ratio versus antenna position.

This nonuniformity may be characterized as a change in pedestal gear ratios for different positions of antenna 10. In other words, since uniform increments of rotation of motor 18 will not produce uniform increments of rotational movement of the antenna, the gear ratio therebetween may be said to have changed. A graph of gear ratio versus rotatable member position is provided in FIG. 3.

Because the gear ratio is not constant, the application directly to motor 18 of the uniform step control signals produced by step track system 24 would result in increments of varying sizes, dependent upon the angular position of antenna 10.

To elminate this undesirable functional dependence, an adaptive interface 26 (FIG. 1) is included in accordance with the teachings of the present invention. Adaptive interface 26 provides compensation which is related to the position of antenna 10 about axis 12. This compensation serves to alter the amplitudes of the step control signal supplied by step track system 24 so as to thereby alter the speed of operation of motor 18 in accordance with the position of antenna 10 about axis 12. The amount of compensation is selected so that fixed increments of angular rotation of antenna 10 will result from each step control signal supplied by step track system 24, regardless of the angular position of antenna 10 about axis 12. In order to provide this function, adaptive interface 26 is responsive to the speed (S) and position (P) signals supplied respectively by tachometer 22 and position sensor 20.

Figure 4:
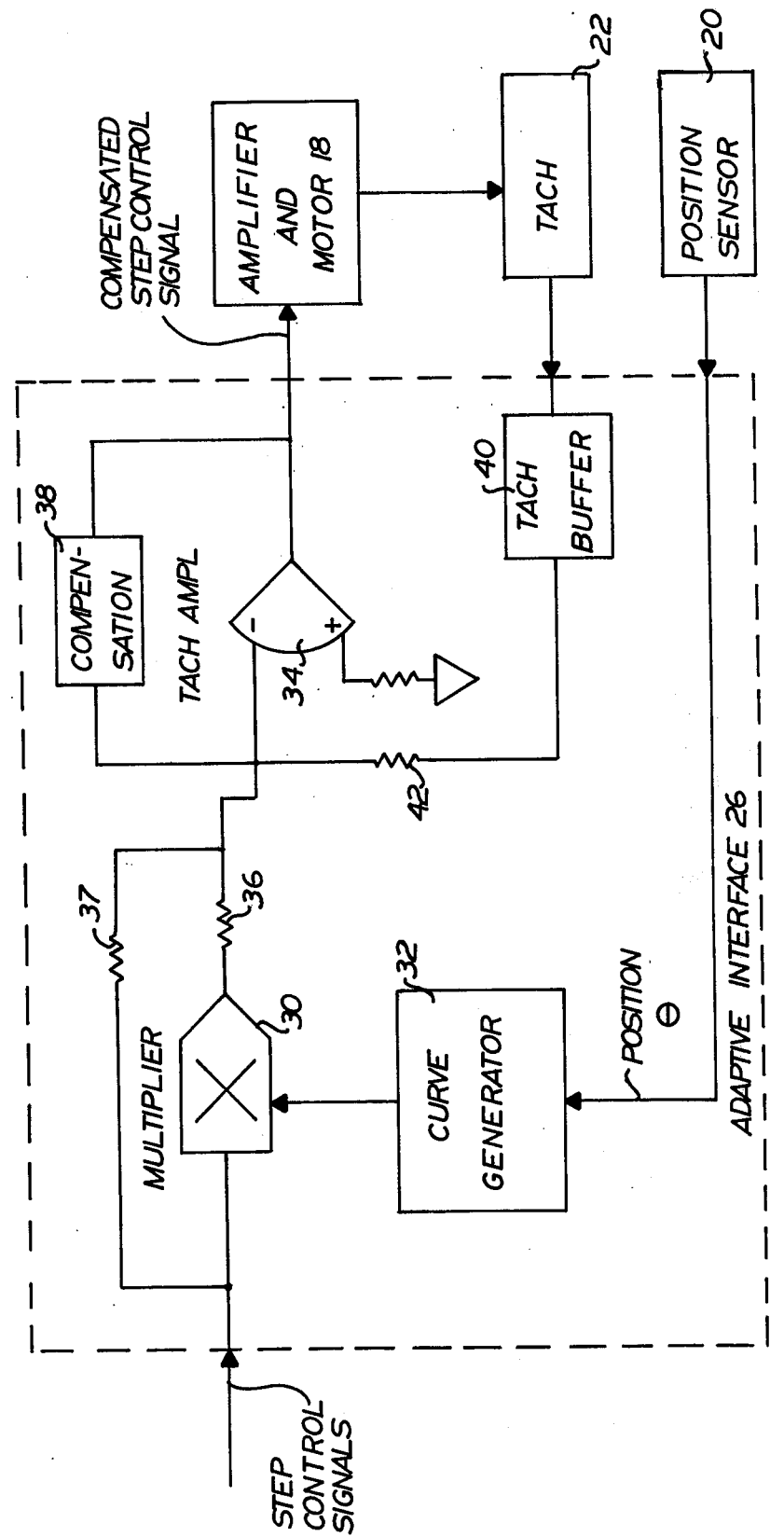
FIG. 4 is a general block diagram of the adaptive interface circuit employed in the system of FIG. 1; and, FIG. 5 is a detailed schematic of the curve generator block of the adaptive interface of FIG. 4.

A more detailed diagram of adaptive interface 26 is provides in FIG. 4. In this figure, it will be seen that the step control signals are supplied to an analog multiplier 30 where they are multiplied with a compensation signal derived by a curve generator 32. Curve generator 32 responds to the rotational position signal supplied by position sensor 20 to provide a compensation signal which varies with positional angle. The net result will be that the gain of the step control signals will vary with positional angle in such a manner as to closely compensate for the changing gear ratio of the antenna pedestal.

The output of multiplier 30 is supplied to an operational amplifier 34 by means of a resistor 36. A component derived directly from the step control signals will be added to this by means of resistor 37. The value of resistor 37 establishes the minimum gain of the adaption interface. Amplifier 34 and its associated circuitry represents a servo control system of a type well known in the art and provides compensated step control signals for operating motor 18 in accordance with the signals supplied to operational amplifier 34 from multiplier 30.

Operational amplifier 34 includes feed back from two sources. A compensation network 38 connects the output of amplifier 34 back to the negative input thereof and is provided for purposes of tailoring the gain and slew rate of the amplifier in accordance with design requirements. In addition, the analog signal generated by tachometer 22 is also fed back to the negative input of amplifier 34 by means of a tach buffer 40 and resistor 42. The amplitude of the compensated step control signals supplied by amplifier 34 will stabilize at a value wherein the speed of motor 18 (as measured by tachometer 22) will linearly match the level of the control signal supplied by multiplier 30, since the feedback derived from tachometer 22 will just balance the control signal at this speed. The speed of operation of motor 18 will therefore directly depend on the amplitude of the control signal supplied by multiplier 30.

Figure 5:
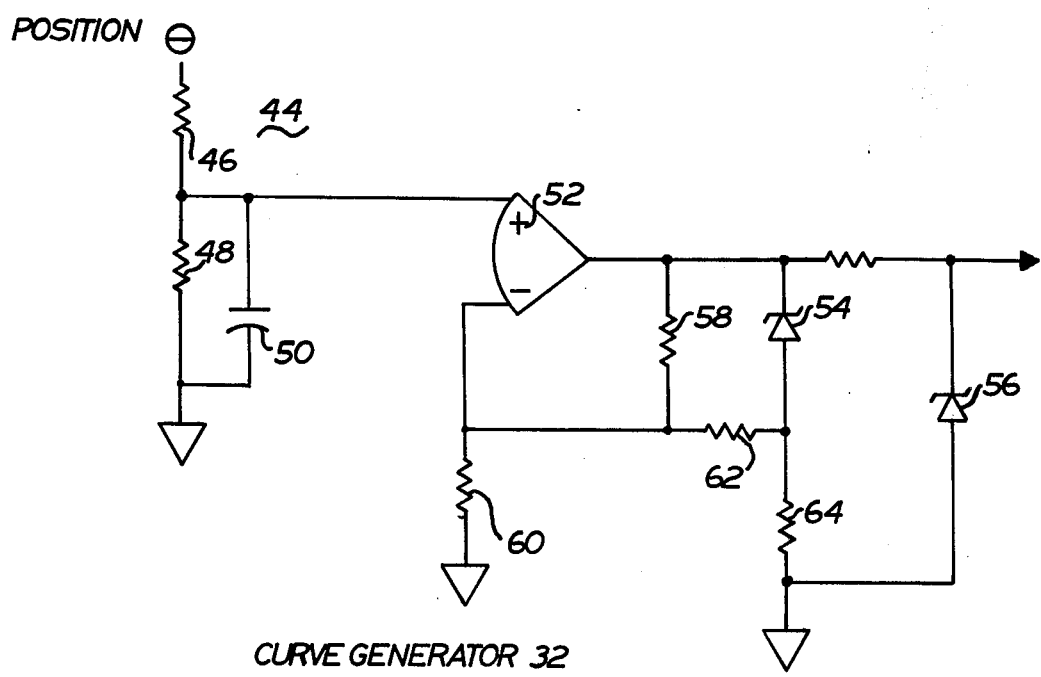

There is illustrated in FIG. 5 a preferred embodiment of the curve generator 32 of FIG. 4. As stated previously, curve generator 32 will provide a multiplier signal to multiplier 30 which will vary with the angular position of the rotatable member RM. The position signals derived from the position sensor 20 are first conditioned by an input filter 44 comprised to two resistors 46 and 48 and a capacitor 50. An operational amplifier 52 responds to the filtered position signal to derive a multiplier signal therefrom.

Operational amplifier 50 includes a feed back network which is designed so that the transfer characteristic of the amplifier will closely match the gear ratio curve of the antenna pedestal. The output of curve generator 32 will therefore directly indicate the present gear ratio of the antenna pedestal. The changes in gain of the control signals with antenna position will thus exactly offset the changes in gear ratio of the antenna pedestal so that a given rotation control signal will always evoke the same angular movement response from antenna 10. The feedback network of the illustrated embodiment is designed to provide a piecewise-linear approximation of the optimum transfer characteristic, and includes three linear-gain segments and two breakpoints.

The breakdown voltages of two zener diodes 54 and 56 establish these break points. For low level input signals, neither zener diode 54 nor zener diode 56 will have broken down, and thus both will be in a high impedance state. The gain of amplifier 52 will then essentially be determined by the ratio of resistor 58 to the resistance defined the combination of resistors 52, 60, and 64.

When break point $BP_1$ (FIG. 3) is reached, diode 54 will begin conduction, thus causing resistor 62 to effectively be coupled in parallel with resistor 58. The gain of amplifier 52 will thus be reduced accordingly. This gain will again remain constant until the output voltage reaches breakpoint $BP_2$, at which point zener diode 56 will begin conduction. Zener diode 56 will thereafter regulate the output voltage so as to prevent further increases thereof.

In this manner, a multiplier signal will be dervied which will very closely match the changing gear ratio of the pedestal. An even closer match could be provided by utilizing a curve generator 32 having a greater number of break points, however for practical purposes the described system will be adequate.

As described, adaptive interface 26 will operate to modify the gain of the step track control signals so as to correct for changing gear ratios in the antenna pedestal. The proper operation of adaptive interface 26 is not dependent, however, upon the control signals taking any particular form. Consequently, any movement control circuit may be used in conjunction with this interface, regardless of the form of the control signals supplied thereby.

Although the invention has been described with respect to a preferred embodiment, it will be appreciated the various rearrangements and alterations of parts may be made without departing from the spirit and scope of the invention, as defined in the appended claims.

What is claimed is:

1. Apparatus for providing rotational positioning of a rotatable member in response to rotation control signals supplied by a rotation control system, comprising a rotational controller including at least one linear actuator mechanically coupled to said rotatable member for controlling the rotational position thereof by adjusting the linear extension of said actuator, said linear actuator being responsive to an actuator control signal for altering the extension of said linear actuator so as to thereby control said rotational position of said rotatable member, wherein the change in rotational position produced by said actuator control signal is dependent upon the position of said rotable member; position indicator means for providing an indication of the position of said rotatable member; and interface means responsive to said indication of the position of said rotatable member and to said rotation control signals for providing modified rotation control signals serving as said actuator control signals, said interface means operating to modify said rotation control signals in accordance with the position of said rotatable member so that the change in rotational position produced by said rotation control signals is not dependent upon the position of said rotatable member.

2. Apparatus as set forth in claim 1 wherein said interface means comprises curve generator means responsive to said indication of the position of said rotatable member for deriving a compensation signal therefrom, said signal multiplier means for multiplying said rotation control signal by said compensation signal so as to thereby generate a product signal serving as said actuator control signal.

3. Apparatus as set forth in claim 1 wherein an antenna is rigidly affixed to said rotatable member and said rotation control system comprises an antenna tracking system employing a step tracking algorithm.

4. Apparatus for providing rotational positioning of a rotatable member in response to rotation control signals supplied by a rotation control system, comprising a rotational controller including at least one linear actuator mechanically coupled to said rotatable member for controlling the rotational position thereof by adjusting the linear extension of said actuator, said linear actuator being responsive to an actuator control for altering the extension of said linear actuator so as to thereby control the rotational position of said rotatable member, wherein the rotation of said rotatable member is a nonlinear function of the extension of said rotatable member such that said rotational controller may be characterized as having a gear ratio which changes with the rotational position of said rotatable member; a position sensor responsive to the rotational position of said rotatable member for providing a position signal in accordance therewith; a compensation signal generator having a transfer characteristic matching the functional dependence of said gear ratio of said rotational controller upon said rotational position of said rotatable member and responsive to said position signal so that a compensation signal is provided at the output thereof which is indicative of the gear ratio of said rotational controller; and multiplier means for multiplying said rotation control signals by said compensation signal so as to provide compensated control signals serving as said actuator control signals, whereby the gain of said actuator control signals is varied in a manner offsetting said changes in said gear ratio so that the change in rotational position produced by said rotation control signals is not dependent upon the position of said rotatable member.

* * * * *